United States Patent Office 2,900,337
Patented Aug. 18, 1959

2,900,337

WEIGHTING MATERIAL

James W. Earley, Oakmont, and William J. McVeagh, Pittsburgh, Pa., assignors to Gulf Research & Development Company, Pittsburgh, Pa., a corporation of Delaware No Drawing. Application December 20, 1956
Serial No. 629,486

3 Claims. (Cl. 252—8.5)

This invention relates to weighting material and particularly to weighting material for fluids used in drilling oil or gas wells. By "weighting material" we mean, a chemical compound or group of compounds, preferably mineral, having a high specific gravity.

It is customary to add heavy minerals to drilling fluids for the purpose of increasing their density. Drilling fluids so treated are better able to offset high gas, oil and water pressure. One of the most common minerals employed for such purpose is barite (barium sulphate). Also employed, but to a lesser extent, are such minerals as iron oxide, lead sulphide (galena) and silica silt.

It is highly desirable to maintain such weighting material in suspension in a drilling fluid throughout the drilling operation, whether or not the drilling fluid is being circulated or is in a quiescent state. Efforts to maintain weighting material in suspension have not always proved successful. For example, the weighting material has a tendency to settle in the hole during drilling operations and gum up the drilling machinery. In addition the weighting material is easily water wet and thus has a further tendency toward leaving the oil phase of an oil base drilling fluid and entering the aqueous phase associated therewith, so that when the water phase is separated therefrom in the mud pit along with other material such as cuttings, the weighting material is also removed. Since in most cases it is necessary to maintain the weighting material in the drilling fluid at all times, it is apparent that additional weighting material must be added to the drilling fluid to make up for that which has settled out in the hole or has been lost in the mud pit.

We have found that the weighting material of this invention obviates such loss and is easily maintained in suspension in an oil base drilling fluid throughout the drilling operation. The improved weighting material comprises one carrying an adsorbed layer or layers of an organic material selected from the group consisting of compounds represented by the following general formulae $$[RN^+H_2(CH_2)_3NH_3^+] [X^-]_2$$

wherein R is selected from alkyl and alkene radicals having about 8 to about 22 carbon atoms, preferably about 12 to about 18 carbon atoms, and X is an anion of an acid (preferably one of a weak organic acid) such as acetate, stearate, oleate, chloride, etc.; and $$[H_3N^+R] X^-$$

wherein R is an alkyl radical having about 6 to about 22 carbon atoms, preferably about 8 to about 15 carbon atoms and X is an anion of an acid (preferably one of a weak organic acid) such as acetate, stearate, oleate, chloride, etc. Representative of alkyl and alkene radicals in the first formula are dodecyl, tetradecyl, octadecyl, octadecenyl, octadecadienyl, etc. Examples of alkyl groups which can be present in the second formula, are octyl, dodecyl, hexadecyl, octadecyl, etc. As examples of compounds which are included in the above formulae and which can be employed in the present invention can be mentioned Duomeen C diacetate $$[(RN^+H_2CH_2CH_2CH_2NH_3^+) (CH_3COO^-)_2$$

wherein R can be n-dodecyl and tetradecyl; Duomeen S diacetate $[(RN^+H_2CH_2CH_2CH_2NH_3^+) (CH_3COO^-)_2$, wherein R can be n-octadecadienyl and octadecynl]; Duomeen T diacetate $[(RN^+H_2CH_2CH_2CH_2NH_3^+) (CH_3COO^-)_2$, wherein R can be n-octadecadienyl, hexadecyl and octadecyl]; Duomeen T dioleate $$[(RN^+H_2CH_2CH_2CH_2NH_3^+)$$
$$(C_8H_{17}CH=CHCH_2CH_2CH_2CH_2CH_2CH_2COO^-)_2$$

wherein R can be n-octadecadienyl, hexadecyl and octadecyl]; Armac 8D $[(H_3N^+R) (CH_3COO^-)$, wherein R is octyl]; Armac 12D $[(H_3N^+R) (CH_3COO^-)$, wherein R is dodecyl]; Armac 16D $[(H_3N^+R) (CH_3COO^-)$, wherein R is hexadecyl]; Armac 18D $[(H_3N^+R) (CH_3COO^-)$, wherein R is octadecyl]; and Alkylamine 81-T acetate $(t-C_{12-15}H_{25-31}N^+H_3) (CH_3COO^-)$.

While any of the conventional weighting material can be employed in the practice of this invention, barite is the preferred weighting agent. Iron oxide, finely-divided silica silt and lead sulphide (galena) also constitute excellent weighting material for use in the present invention. Although the size of the weighting material is not critical, we prefer to employ weighting material having a particle size so that 99 percent will pass at least a 50 mesh screen, preferably at least a 200 mesh screen.

In order to obtain the beneficial results of this invention, the weighting material should be covered with an adsorbed layer of the organic compounds defined in the structural formulae hereinabove. While best results are obtained when the entire surface area of the individual particles making up the weighting material is substantially completely covered with an adsorbed layer of the organic compound, improved results are still obtained when at least about 50 percent, and preferably at least about 75 percent, of the surface of the individual particle is coated with an adsorbed layer of the organic compound. The amount of the organic compound, relative to the weighting material, required to obtain the desired coverage of the individual particles is at least about 0.01 and preferably about 0.1 to about 0.5 percent by weight.

To obtain the desired coated weighting material, any effective method which will permit the defined organic material to come in contact with the weighting material and adhere thereto is satisfactory. Thus, the defined organic material can be dissolved in an appropriate solvent such as benzene, water, etc., after which the solution can be mixed with the weighting material. The weighting material can then be removed from solution and dried to remove the solvent therefrom. The weighting material remaining will carry a coating of the organic material.

The invention can be better described by reference to the following examples. The oil employed was a crude from the Ellenberger Field in West Texas having the following specification.

| | |
|---|---|
| API gravity | 42° |
| Percent sulfur by weight | 0.18 |
| Viscosity at 100° F., centistokes | 3.27 |
| Percent boiling in the 50° to 200° C. boiling range at atmospheric pressure | 26.3 |
| Paraffin-naphthene content of above fraction, percent | 88.5 |
| Aromatic content of above fraction, percent | 11.5 |
| Wax content of crude, percent | 3.5 |
| Resin content of crude, percent | 3.9 |

The above oil was mixed with ten times its volume of normal pentane to precipitate the asphaltenes, which were filtered off. Pentane was then stripped from the filtrate and the resulting asphaltene-free crude was freed of colored resins by elution chromatography over alumina, pentane being the eluent. The pentane was stripped from the eluate; the pentane-free eluate was the "crude" oil used in the tests. Barite having the following particle size was employed.

| Particle Size | Wt. (grams) | Percent | Mesh |
|---|---|---|---|
| >0.125 mm | 0.09 | 0.3 | >120 |
| 0.125–0.074 mm | 0.53 | 2.0 | <120 |
| 0.074–0.044 mm | 2.39 | 9.1 | <230 |
| >0.044 mm | 23.32 | 88.6 | <325 |

Example I 0.39 gram of Armac 8D [$(H_3N^+R)(CH_3COO^-)$ wherein R is octyl] was dissolved in 15 milliliters of oil defined above. This solution was added to a suspension of 2 grams of the above-defined barite in 5 milliliters of water. The mixture was shaken for 15 minutes and allowed to stand over night. All of the barite was carried in the emulsion phase which formed and it was found that the barite was oil wet, indicating that the barite will remain in the oil phase and will not be removed from the system upon removal of water therefrom.

Example II

The run of Example I was repeated except that in place of Armac 8D 0.50 gram of Armac 12D [$(H_3N^+R)(CH_3COO^-)$, wherein R is dodecyl] was employed. Again the results obtained were identical to those of Example I.

Example III

Again the run of Example I was repeated except that in place of Armac 8D 0.55 gram of alkylamine 81–T acetate [$t\text{-}C_{12-15}H_{25-31}N^+H_3$][$CH_3COO^-$] was employed. The results were again similar to those of Example I.

Example IV

Again as in Example I, 1.93 grams of Duomeen T dioleate

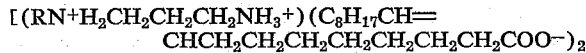
[$(RN^+H_2CH_2CH_2CH_2NH_3^+)(C_8H_{17}CH= CHCH_2CH_2CH_2CH_2CH_2CH_2CH_2COO^-)_2$]

wherein R can be n-octadecadienyl, hexadecyl and octadecyl] was dissolved in 15 milliliters of the oil defined. This solution was added to a suspension of 2 grams of the defined barite in 5 milliliters of water. The mixture was shaken for 15 minutes and allowed to stand over night. All of the barite was eventually carried in the emulsion which formed. It was found that the barite became oil wet on standing. This indicates that the barite will remain in the oil phase and will not be removed from the system upon removal of water therefrom.

Example V

In place of Armac 8D of Example I, 0.85 gram of Duomeen C diacetate

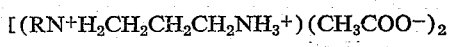
[$(RN^+H_2CH_2CH_2CH_2NH_3^+)(CH_3COO^-)_2$]

wherein R can be n-dodecyl and tetradecyl] was employed. All of the barite was carried in the emulsion, and it was found to be oil wet and at the oil-water interface. This shows that the barite will tend to remain in the oil phase and will not be removed from the system upon removal of water therefrom.

Example VI

Repeating the run of Example V, but using 1.04 grams of Duomeen S diacetate

[$(RN^+H_2CH_2CH_2CH_2NH_3^+)(CH_3COO^-)_2$]

wherein R can be n-octadecadienyl and octadecenyl] in place of Duomeen C diacetate gave results identical to those of Example V.

Example VII

When the run of Example V was again repeated using 1.04 grams of Duomeen T diacetate

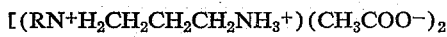
[$(RN^+H_2CH_2CH_2CH_2NH_3^+)(CH_3COO^-)_2$]

wherein R can be n-octadecadienyl, hexadecyl and octadecyl] in place of Duomeen C diacetate, the results obtained were again identical to those of Example V.

From a consideration of the above examples it can be seen that the treated weighting material of this invention will remain in suspension and in the oil phase of a drilling fluid. Although barite was employed in the above examples, other weighting agents such as iron oxide, finely-divided silica silt and lead sulphide similarly treated will produce similar results.

Obviously, many modifications and variations of the invention as hereinabove set forth can be made without departing from the spirit and scope thereof, and therefore only such limitations should be imposed as are indicated in the appended claims.

We claim:

1. Weighting material carrying an adsorbed layer of an organic material selected from the group consisting of compounds represented by the following general formulae:

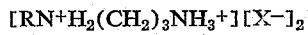
$$[RN^+H_2(CH_2)_3NH_3^+][X^-]_2$$

wherein R is selected from the group consisting of alkyl and alkene radicals and X is an anion of an acid; and

$$[H_3N^+R]X^-$$

wherein R is an alkyl radical and said latter X⁻ is an anion of an acid, the amount of said organic material being sufficient to provide a layer covering at least about 50 percent of the surface of the individual weighting material, said weighting material being rendered oil wet as a result of carrying such layer of organic material.

2. Weighting material carrying an adsorbed layer of an organic material selected from the group consisting of compounds represented by the following general formula:

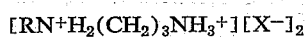
$$[RN^+H_2(CH_2)_3NH_3^+][X^-]_2$$

wherein R is selected from the group consisting of alkyl and alkene radicals and X is an anion of an acid, the amount of said organic material being sufficient to provide a layer covering at least about 50 percent of the surface of the individual weighting material, said weighting material being rendered oil wet as a result of carrying such layer of organic material.

3. Weighting material carrying an adsorbed layer of an organic material selected from the group consisting of compounds represented by the following general formula:

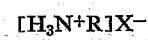
$$[H_3N^+R]X^-$$

wherein R is an alkyl radical and X is an anion of an acid, the amount of said organic material being sufficient to provide a layer covering at least about 50 percent of the surface of the individual weighting material, said weighting material being rendered oil wet as a result of carrying such layer of organic material.

References Cited in the file of this patent

UNITED STATES PATENTS

| | | |
|---|---|---|
| 2,216,955 | Moore | Oct. 8, 1940 |
| 2,531,812 | Hauser | Nov. 28, 1950 |
| 2,675,353 | Dawson | Apr. 13, 1953 |
| 2,797,196 | Dunn et al. | June 25, 1957 |